United States Patent Office 3,490,241
Patented Jan. 20, 1970

3,490,241
STABILIZATION OF SOIL BY DIFFUSION OF CATIONS
Jason G. Kuhn, Pacifica, Calif., asisgnor to Edward D. Graf, Daly City, Calif.
No Drawing. Filed Aug. 25, 1967, Ser. No. 663,214
Int. Cl. E02d 3/12; E01c 11/24
U.S. Cl. 61—36                                            12 Claims

ABSTRACT OF THE DISCLOSURE

Use of certain inorganic and organic salts dissolved and ionized in an aqueous solution for the stabilization of soil. Application and distribution of the solution is accomplished by physical diffusion of ions through the soil so that the soil is stabilized at a location spaced from the point of application, as well as at the point of application. Stabilization involves an exchange of ions with the ions normally occurring in the soil particle lattice. Materials used include aqueous solutions of trivalent metal salts, low molecular weight amine-acid salts, calcium chloride, calcium orthophosphate, and ammonium phosphate.

---

This invention relates to the stabilization of soil by application of aqueous solutions of certain ionized organic and inorganic materials. More particularly, it relates to the distribution of aqueous solutions of soil stabilizing ionized salts by the unaided physical diffusion of the salts through the soil.

One area of stabilization of soil is commonly associated with the construction of buildings, bridges, tunnels, roads, and similar projects. Frequently, the existing soil structure is not capable of supporting the weight of the structure to be built on or in the soil. To date, no technique is available for stabilizing soil that has become unstable after the structure has been built. For example, where a home is involved in an active slide, there is little that can be done until the sliding soil has stopped, at which point remedial steps and repairs can be undertaken.

The present invention provides methods that are uniquely suited for use in treating an active slide situation. No substantial cutting or excavating of the soil is required. Instead, the method contemplates the application of solutions of certain chemicals at selected locations in the soil to be stabilized. The chemicals then migate throughout the soil mass by diffusion to accomplish the desired stabilization in the absence of any substantial movement of liquid from the area(s) of initial application.

In addition to the treatment of active slide areas, the method is applicable broadly to the stabilization of soil without reference to the stability of the soil at the time of treatment or the presence or absence of structures. Nevertheless, it will be appreciated that the method has particular advantage to those problem areas where structures exist and direct access to the entire mass of soil to be stabilized is difficult, if not possible.

In the preferred embodiment, the invention utilizes an aqueous solution containing a dissolved soil stabilizing agent. Any ionizable water soluble material which yields cations that will diffuse through the soil and exchange with naturally occurring cations in the soil to improve the soil stability can be utilized. To date, best results have been obtained with salts of trivalent metal cations, acid salts of low molecular weight amines, i.e., those having up to about 8 carbon atoms, calcium orthophosphate, ammonium phosphate, and calcium chloride.

To practice the method, a suitable amount of an aqueous solution of the selected chemical material is simply applied to the soil and the diffusion process allowed to operate. Surface application is contemplated, as well as subsurface applications. For example, the solution can simply be poured over the soil surface and then preferably compacted to create a suitable building site. Alternatively, exceptional results have been obtained where holes are bored in the surface down to a suitable depth and the solution poured into the holes. Diffusion into the soil between the holes achieves a uniformity of stabilization. By utilizing the holes, rapid penetration to relatively great depths can be obtained.

The chemicals utilized in the present concept serve to convert expansive-type soils into nonexpansive soils. Because of this, earth that is cut in a leveling operation can be used as a fill at the same job site, even if the soil is of the expansive type. Here a convenient mode of operation would be to add the necessary ingredients to the water trucks, for example, used in a conventional fill operation.

Making expansive soil into a nonexpansive soil may also eliminate the need for present methods designed to anchor a foundation to a suitable soil layer below an expansive soil surface. Thus, concrete piers that are now sunk down to a nonexpansive layer can be eliminated where the present methods are utilized.

In more detail, the chemical materials selected for the present invention must be water soluble and ionizable therein. In general, many useful materials require the addition of an acid to the solution to bring about the desired solubility and ionized condition. For example, one of the preferred materials, calcium orthophosphate, may be solubilized with the addition of phosphoric acid. Similarly, the low molecular weight amines require the addition of an acid to form the ionizable acid salt. The trivalent metals are a preferred group for use in the present method and are conveniently utilized as a metal salt such as ferric chloride, aluminum chloride, or aluminum nitrate. Ferric oxide is brought into solution as an iron salt when the solution is sufficiently acidified. Calcium chloride is another inorganic material that has been found to give advantageous results. Still another inorganic salt to be used for excellent results is ammonium phosphate.

As noted, the invention contemplates the use of low molecular weight amines containing up to about 8 carbon atoms and solubilized as acid salts. Strong mineral acids such as hydrochloric acid are suitably used to solubilize the amine. Typical low molecular amines include ethylamine, propylamine, methylbutylamine, triethylamine, octylamine, methylisopropylamine, and the like.

Application of a solution of the selected chemical benefits the soil treated in a number of ways, including the noted reduction in the expansive properties of the soil. The treatment also increases the void volume of the soil and increases the cohesiveness of the soil. It is believed that the cations of the inorganic materials used, such as the trivalent metal cations, exchange with the naturally occurring cations in the soil lattice. When so exchanged, it is believed that the new metal cations inhibit the entrance of polar molecules such as water and thereby prevent or at least reduce expansion of the soil particle lattice The cations can be considered as creating a type of internal blockage within the soil structure as distinguished from the function of higher molecular weight materials that can be used as an external coating on the soil to prevent penetration and expansion of the soil.

The organic amine materials of low molecular weight contemplated by the present method are also believed to function by an ion exchange mechanism with the cations naturally present in the soil particles. In this case, additional factors may be involved in uniting the amine cation with the soil. These other factors may include cation attachment to negative charges, as well as holding by Coulombic forces and by Van der Waals' forces.

To illustrate the effectiveness of the present type of ionized salts and their ability to diffuse unaidedly through the soil without movement of the aqueous solution itself, the following is offered.

EXAMPLE I

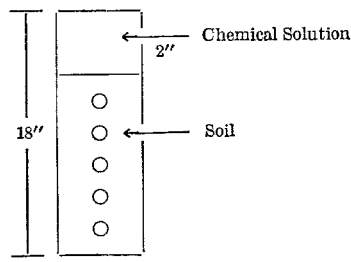

A series of plastic tubes 18" x 2½" were set up. Each tube had several 1" holes along the length of the tube. The holes were plugged and taped so as to be air- and water-tight. The tubes were then filled with a staturated clay soil (mud taken from San Francisco Bay) and adobe from Contra Costa County (California) and allowed to come to equilibrium. This was done to eliminate the possibility of movement of water through the soil during the test.

At the beginning of each test a chemical solution was placed on top of the soil and both ends of the tube sealed to prevent evaporation and water leaks. A number of tubes were utilized for each chemical. In addition, two control samples were kept for comparison. After a period of time, a vane shear device calibrated in in.-lbs. was utilized to obtain soil strengths at the depth of each hole in the tube. The results on the two types of soil are as follows:

EXAMPLE II

A series of samples of a mixture of soil and water in a paste form were prepared. The paste was then mixed with 10% aqueous solutions of various chemicals included by the present invention. The treated soil pastes were then tested with a vane shear torque tester calibrated in in.-lbs. at the time intervals noted. The soil strengths obtained are listed below.

TABLE II

| Chemical | Length of contact (day) | Observed soil strength (in.-oz.) | Length of contact (day) | Observed soil strength (in.-oz.) | Length of contact (day) | Observed soil strength (in.-oz.) | Length of contact (day) | Observed soil strength (in.-oz.) |
|---|---|---|---|---|---|---|---|---|
| Ammonium phosphate | 1 | 7 | 2 | 15 | 6 | 17 | 10 | 18 |
| Ethylamine hydrochloride | 1 | 9 | 2 | 9 | 6 | 11 | 10 | 12 |
| Calcium orthophosphate | 1 | 4 | 2 | 17 | 6 | 24 | 10 | 26 |
| Ferric chloride | 1 | 7 | 2 | 8 | 6 | 9 | 10 | 10 |
| Ferric oxide | 1 | 7 | 2 | 8 | 6 | 9 | 10 | 9 |
| Aluminum chloride | 1 | 4 | 2 | 6 | 6 | 10 | 10 | 12 |
| Aluminum nitrate | 1 | 3 | 2 | 4 | 6 | 6 | 10 | 7 |
| Calcium chloride | 1 | 8 | 2 | 9 | 6 | 10 | 10 | 10 |
| Water only | 1 | 3 | 2 | 3 | 6 | 3 | 10 | 7 |

Although surface distributions can be made, best results for many jobs can be obtained by placing the chemical solution below the soil surface. In that way a more rapid penetration to relatively greater depths is obtained. In the preferred embodiment, a series of holes can be drilled in the soil surface. These holes are preferably up to about 1.5–2.0" in diameter. With such holes excellent results have been obtained where the holes are distributed on spaced centers of about 2–8 ft. and preferably on spaced centers of about 4 ft. The depth of the holes is governed by the depth to which stabilization is desired. Distribution at all depths is obtained simply by filling the hole with sufficient solution.

An amount of solution required to develop the desired amount of soil stabilization is contemplated. Generally, relatively concentrated solutions are utilized in which the chemical is present in concentrations up to and including the saturation point. Generally, if the saturated point of the solution is not first reached, the solution should not exceed about 10% concentration of chemical on a weight to volume basis. Utilizing such concentration, most soils can be stabilized by applying the solution at the rate of about 1 qt. for 5 gal. per 100 cu. ft. of soil to be stabilized. Most generally, application at the rate of about 1 gal./100 cu. ft. of soil will give highly satisfactory results.

Although the foregoing invention has been described in some detail by way of illustration and example for purposes of clarity of understanding, it is understood that certain changes and modifications may be practiced with-

TABLE I

| San Francisco Bay mud | | | | Contra Costa County Adobe | | | |
|---|---|---|---|---|---|---|---|
| Chemical | Tube hole No. from top | Length of contact (days) | Observed results (in. lbs.) | Chemical | Tube hole No. from top | Length of contact (days) | Observed results (in. lbs.) |
| Ethylamine hydrochloride (5% solution). | 1 | 15 | 3½ | Ethylamine hydrochloride (5% solution). | 1 | 15 | 4 |
| | 2 | 15 | 4 | | 2 | 15 | 5 |
| | 3 | 15 | 4½ | | 3 | 15 | 6 |
| | 4 | 15 | 4½ | | 4 | 15 | 6 |
| | 5 | 15 | 3½ | | 5 | 15 | 4 |
| Ammonium phosphate (5% solution). | 1 | 15 | 14 | Ammonium phosphate (5% sloution). | 1 | 15 | 4½ |
| | 2 | 15 | 4 | | 2 | 15 | 4½ |
| | 3 | 15 | 4 | | 3 | 15 | 4½ |
| | 4 | 15 | 3½ | | 4 | 15 | 4½ |
| | 5 | 15 | 1½ | | 5 | 15 | 2 |
| Aluminum chloride (5% solution). | 1 | 15 | 3 | Aluminum chloride (5% solution). | 1 | 15 | 3½ |
| | 2 | 15 | 3½ | | 2 | 15 | 4½ |
| | 3 | 15 | 3½ | | 3 | 15 | 4½ |
| | 4 | 15 | 3½ | | 4 | 15 | 4½ |
| | 5 | 15 | 1½ | | 5 | 15 | 2 |
| Calcium orthophosphate (5% solution). | 1 | 15 | 4 | Calcium orthophosphate (5% solution). | 1 | 15 | 4½ |
| | 2 | 15 | 4½ | | 2 | 15 | 5 |
| | 3 | 15 | 4½ | | 3 | 15 | 5½ |
| | 4 | 15 | 4½ | | 4 | 15 | 5 |
| | 5 | 15 | 3 | | 5 | 15 | 4 |
| Control (water only) | 1 | 15 | 1½ | Control | 1 | 15 | 2 |
| | 2 | 15 | 1½ | | 2 | 15 | 3 |
| | 3 | 15 | 1½ | | 3 | 15 | 2 |
| | 4 | 15 | 1½ | | 4 | 15 | 2 |
| | 5 | 15 | 1½ | | 5 | 15 | 2 | in the spirit of the invention as limited only by the scope of the appended claims.

What is claimed is:

1. A method of stabilizing soil comprising: initially contacting a plurality of spaced apart sections of soil to be stabilized with an aqueous solution containing a dissolved stabilizing agent selected from the group consisting of trivalent metal cations, a low molecular weight amine having up to about 8 carbon atoms, calcium orthophosphate, ammonium phosphate, and calcium chloride; said soil sections being contacted with a sufficient amount of said solution to stabilize the soil initially contacted together with soil located between said soil sections; the stabilizing agent in said solution reaching the soil located between said spaced apart sections substantially solely by diffusion.

2. A method in accordance with claim 1 wherein said aqueous solution is acidic.

3. A method in accordance with claim 1 wherein said aqueous solution is contacted with said spaced apart soil sections by making holes in the soil sections vertically downwardly from the surface and inserting said solution into said holes.

4. A method in accordance with claim 3 wherein said holes are distributed on spaced centers of about 2–8 feet.

5. A method in accordance with claim 4 wherein said holes are distributed on spaced centers of about 4 feet.

6. A method in accordance with claim 5 wherein said holes have a diameter of up to about 1.5–2.0".

7. A method in accordance with claim 1 wherein the stabilizing agent in said solution is in a concentration of up to and including the saturation point, but not exceeding about 10%.

8. A method in accordance with claim 1 wherein said stabilizing solution is applied at the rate of about 1 quart for 5 gallons per 100 cubic feet of soil to be stabilized.

9. A method in accordance with claim 8 wherein the stabilizing agent solution is applied at the rate of about 1 gallon per 100 cubic feet of soil to be stabilized.

10. In the method for stabilization of soil by distributing a liquid chemical through the soil, the improvement comprising applying to the soil an aqueous solution consisting of from about 5 to 10%, on a weight to volume basis, of an ionized chemical containing a soil-strengthening cation of the type that stabilizes the lattice of the soil particles by mechanisms including ion exchange with exchangeable cations naturally occurring in the soil particle lattice, the cation in said liquid chemical being in an amount sufficient to stabilize the soil being treated, the distribution of said liquid chemical including diffusion through the soil by ionic migration to stabilize the area of said migration.

11. The method in accordance with claim 10 wherein said aqueous solution comprises an aqueous solution containing a member of the group consisting of ammonium phosphate, calcium orthophosphate, ferric chloride, ferric oxide, aluminum chloride, calcium chloride, and aluminum nitrate.

12. The method in accordance with claim 10 wherein said aqueous solution contains an acid salt of a low molecular weight amine having up to about 8 carbon atoms.

References Cited

UNITED STATES PATENTS

| 2,329,148 | 9/1943 | Van Leeuwen | 61—36 |
| 3,288,040 | 11/1966 | Burrows | 61—36 X |
| 3,176,471 | 4/1965 | Ramos et al. | 61—36 |
| 3,332,245 | 7/1967 | Caron | 61—36 |
| 3,368,356 | 2/1968 | Graf | 61—36 |

JACOB SHAPIRO, Primary Examiner

U.S. Cl. X.R.

61—1; 94—25